UNITED STATES PATENT OFFICE.

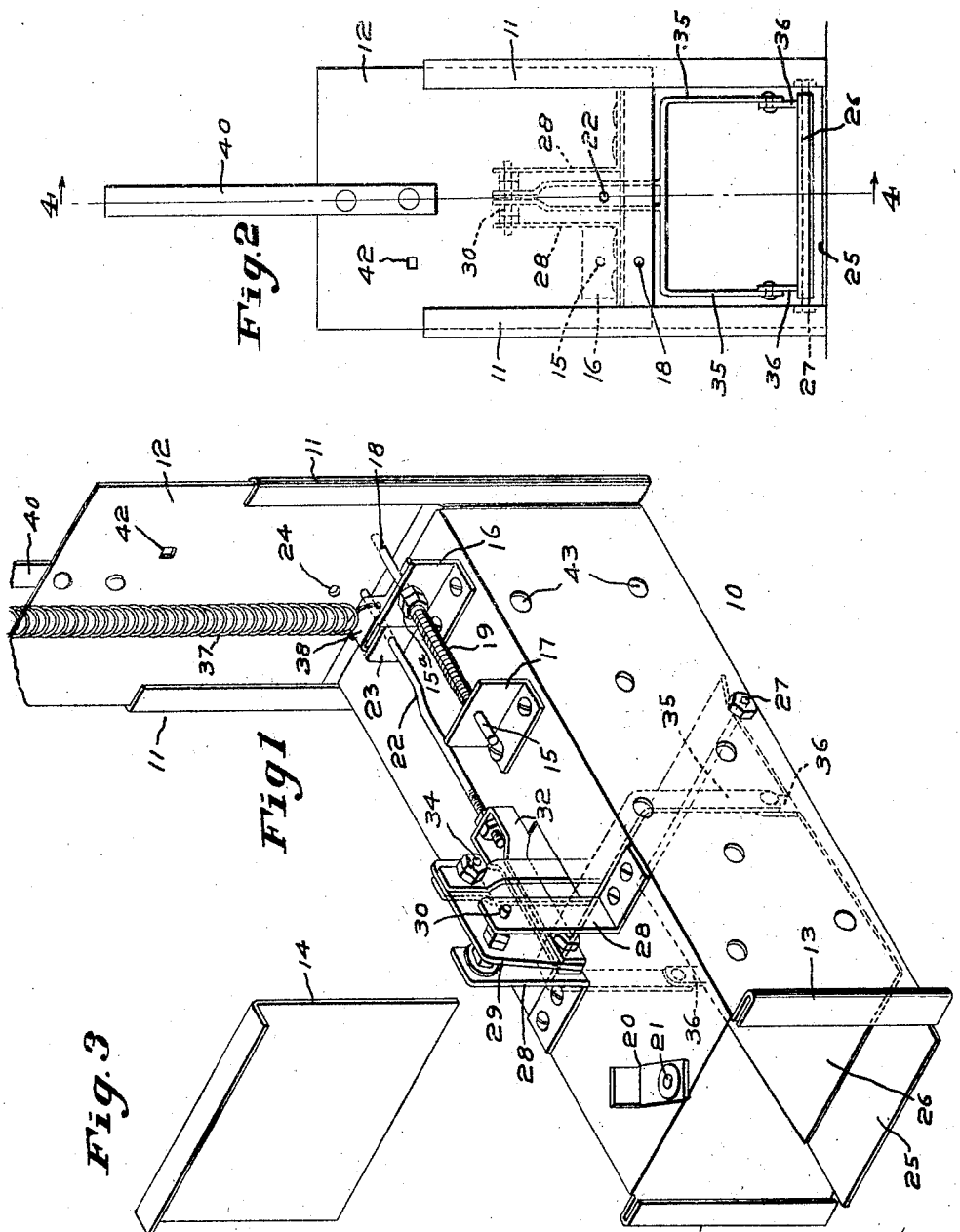

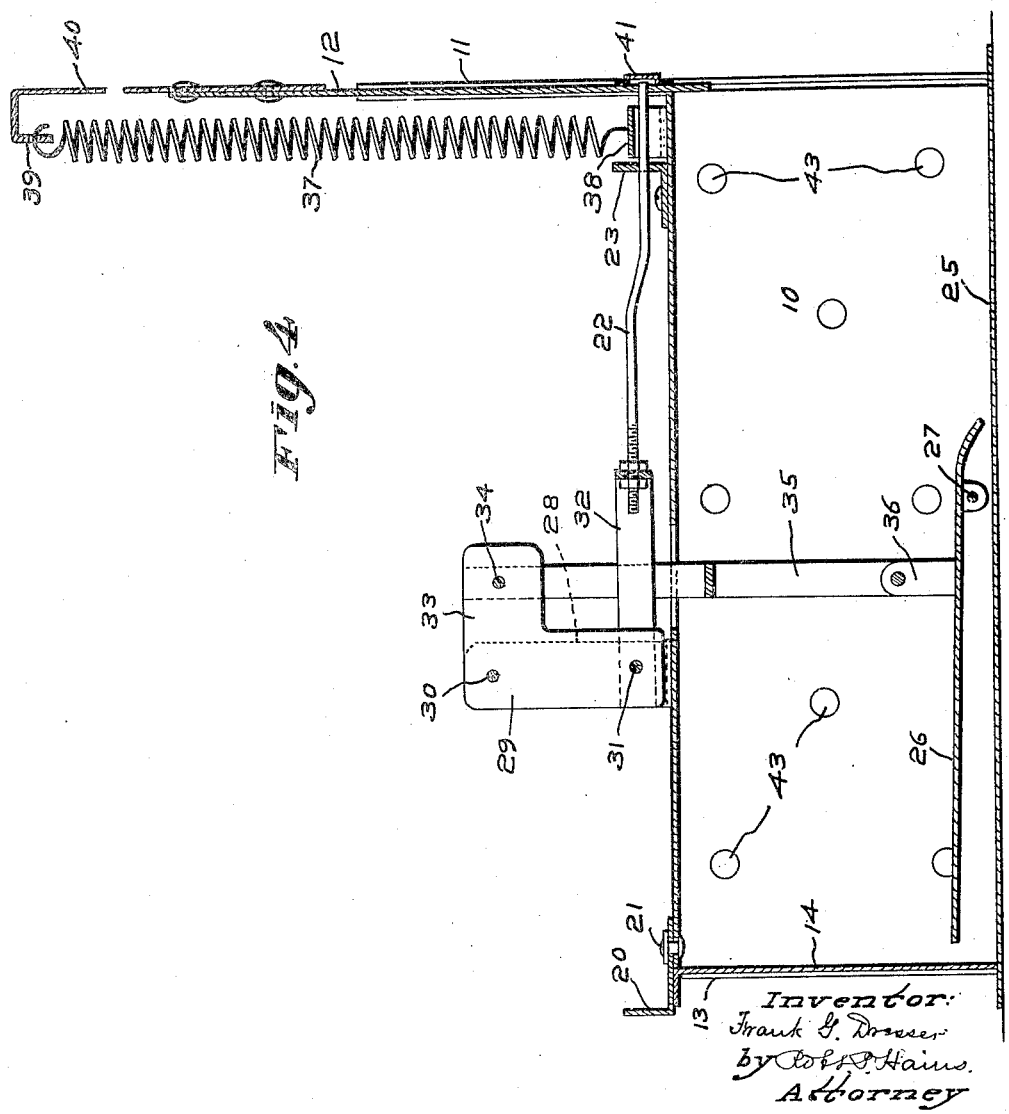

FRANK G. DRESSER, OF PROVIDENCE, RHODE ISLAND.

RAT-TRAP.

1,382,416.  Specification of Letters Patent.  Patented June 21, 1921.

Application filed September 14, 1920. Serial No. 410,226.

*To all whom it may concern:*

Be it known that I, FRANK G. DRESSER, a citizen of the United States, and residing at Providence, county of Providence, and State of Rhode Island, have invented an Improvement in Rat-Traps, of which the following description, in connection with the accompanying drawings, is a specification, like characters on the drawings representing like parts.

This invention relates to traps for catching rats, mice, and other rodent animals.

Various types of traps for this purpose have been heretofore proposed, but difficulty has been experienced in inducing the animals it is desired to catch, to enter the trap. Rats and mice are usually very clever in detecting the existence of a trap, and many of them cannot be induced to enter one, by the most tempting bait. They seem to possess a very highly-developed sense for detecting the danger of traps in general.

An important feature of the present invention, therefore, is to provide a trap which is so constructed that the animal which it is desired to catch is permitted, at first to enter freely either end of the trap and pass through the same without being molested. As the rat or other animal for which the trap is set becomes accustomed to entering the trap and eating the food therein without being disturbed or frightened, he will gradually become less cautious, whereupon the parts of the trap are adjusted so that the next time he enters the trap he will be caught.

The accompanying drawings illustrate a good practical form of the invention, the details of which may be modified within the true scope thereof, as defined by the claims.

In the drawings:—

Figure 1 is a perspective view of a trap constructed in accordance with the present invention, the doors at the opposite ends of the trap being shown open;

Fig. 2 is a front view of the trap shown in Fig. 1;

Fig. 3 is a perspective view of the rear door; and

Fig. 4 is an enlarged sectional view taken on line 4—4 of Fig. 2.

In the embodiment of the invention illustrated, an elongated hollow receptacle 10 is shown as substantially square in cross section. The receptacle 10 has its opposite ends open to form an unobstructed opening through the trap, and doors are provided for closing when desired, the ends of the receptacle.

In the present instance of the invention, the receptacle 10 and doors for the same are constructed of sheet metal, although these parts may obviously, if desired, be made of wood or any other suitable material. The forward end of the receptacle is shown as provided with spaced vertical guides 11 in which the forward door 12 is slidably mounted, and the rear end of the receptacle is provided with spaced vertical guides 13 in which the door 14 is slidably mounted.

As above stated, it is desirable to so construct the trap that the animals to be caught are given ample opportunity to inspect the interior of the trap without being frightened or disturbed, so that they will learn to enter the trap. Therefore, when the trap is first set in the place frequented by the rats or other animals desired to be caught, both doors 12 and 14 are left open for a sufficient length of time to permit the animals to learn to enter the trap freely and eat the bait placed therein. To this end the door 14 may be entirely removed from the trap, and the door 12 may be firmly secured in its open position as shown in Fig. 1, by a sliding bolt 15. In the embodiment shown, the bolt 15 is slidably supported in a pair of brackets 16 and 17 secured to the top of the receptacle, and the forward end of this bolt is positioned to enter an aperture 18 formed near the bottom of the door 12, the construction being such that the door is held in its open position as long as the bolt 15 projects into the aperture 18. The forward movement of the bolt 15 is limited by a shoulder 15$^a$ thereupon, positioned to abut against the bracket 16, and the bolt 15 is normally projected by a spring 19 placed about the bolt and having one end reacting against the bracket 17 and the other end against the shoulder 15$^a$.

As soon as the animal to be caught has lost his fear of the trap, and has learned to enter the same for food, the trap may be set so that the next time he enters therein he will be caught. To this end the rear of the trap is closed by the door 14, as shown in Fig. 4, and the door 14 is preferably locked in its closed position by a turn-button 20 pivoted at 21 to the top of the receptacle, the button being so positioned that it may be swung from its inoperative position shown in Fig. 1 to that shown in Fig. 4, in which the button extends over the top of the door. Then the front door 12 is released from the bolt 15 and is placed under the control of treadle-operated mechanism to be described, so that when the animal again enters the trap he will operate the treadle mechanism and effect the closing of the door 12.

The particular treadle-controlling mechanism disclosed will now be described. Mounted on the top of the receptacle 10 is a sliding pin or latch 22 having its forward end portion slidably supported by a bracket 23 secured to the cover, and the forward end of the pin 22 is positioned to enter an aperture 24 in the door 12, as shown in Fig. 4. The arrangement is such that the aperture 24 is not in horizontal alinement with the aperture 18, but when the door 12 is held open by the pin 22, the aperture 18 lies slightly below and out of alinement with the bolt 15, so that the bolt 15 will not prevent the door from closing when released from the pin 22, thus forming alternative securing means for the door 12 in which but one of the securing means 15 and 22 will hold the door at the same time. Within the receptacle 10, adjacent the floor 25 thereof, is swingingly mounted a platform treadle 26, which is pivotally mounted within the receptacle by a pivot pin 27 at a sufficient distance from the front door 12 to prevent the treadle from being operated by the animal until he is well within the trap, and the treadle 26 is large enough to insure that the animal will step upon the same as he approaches the rear door. Upon the upper face of the receptacle are rigidly mounted a pair of spaced uprights 28, between the upper ends of which a bell crank lever 29 is pivotally mounted by a pivot pin 30. One arm of the bell crank lever 29 is pivotally secured by a pin 31 to a link 32, the other end of the link 32 being secured to the longitudinally-sliding pin 22 to operate this pin. The other arm 33 of the bell crank lever 29 is pivotally connected by a pivot pin 34 to a pair of links 35 extending into the receptacle and having their lower ends pivotally connected to ears 36 formed upon the treadle 26. The operation of the treadle mechanism is such that upon moving the door 12 to the position in which the aperture 24 lies opposite the pin 22, the treadle 26 may be raised as shown in Fig. 4, so that the bell crank lever 29 will be operated by the links 35 to move the pin 22 into the aperture 24 of the door. The trap is now set, and when an animal such as a rat, enters therein and steps on the treadle 26, its weight will move the free end of this treadle downward, and thus retract the pin 22 and allow the door 12 to close in an obvious manner.

The weight of the door 12 tends to close the same, but to insure that the door will close quickly when released by the pin 22, a spring 37 may be provided, one end of which is secured to the top of the receptacle, as at 38, while the other end of this spring is secured at 39 to a standard 40 carried by the door 12.

In order to limit the extent to which the pin 22 may enter the aperture 24, a stop plate 41 is preferably secured to the front face of the door 12 over the aperture 24.

It is desirable to provide means for securing the door 12 in its closed position, and to this end the door is provided with an aperture 42, so positioned that when the door is moved to its closed position the outer end of the spring-operated bolt 15 will be automatically projected into this aperture.

The walls of the receptacle 10 preferably have a number of apertures 43 formed therein to permit water to freely enter the trap, should it be desired to drown the animal caught in the trap, without removing the same from the trap.

What is claimed is:—

1. A rat trap comprising, in combination, a hollow body portion provided with open ends for the free passage of rats into, through and out of the trap, a door for automatically closing one end of the body portion, a bolt operable to lock the door in the open position to permit the rats to pass through the trap freely, latch mechanism for holding the door in its open position when the door is unlocked and the trap is set, said bolt operable independently of the latch mechanism for securing the door in either open or closed position, a manually controlled closure for closing the other end of the body portion, and means within the body portion operable by the rat to trip the latch mechanism and close the door.

2. A rat trap comprising, in combination, a hollow receptacle provided with open ends and having an unobstructed passage through the receptacle for the free passage of rats into, through and out of the trap, a sliding door for automatically closing one end of the receptacle, a bolt and a latch selectively operable to hold the door open, the bolt operable to retain the door open to allow a rat to pass unmolested through and out of the trap and the latch operable to hold the door in its open position when released from the bolt and the trap is set, means within the hollow receptacle operable by the rat to trip the latch and close the door, and a closure for the opposite end of the receptacle.

3. A rat trap comprising, in combination, a hollow receptacle provided with open ends for the free passage of rats into, through and out of the trap, a sliding door for automatically closing one end of the receptacle, a bolt operable to lock the door in the open position to permit the rats to pass through the trap freely, latch mechanism for holding the door in its open position when the door is unlocked and the trap is set, a manually controlled closure for closing the other end of the receptacle, and a treadle within the receptacle operable upon a rat stepping upon the same to release the latch mechanism and close the door.

4. A rat trap comprising, in combination, a hollow receptacle having a passageway therethrough and open ends to permit rats to pass freely through the trap, a sliding door movable automatically to close one end of the receptacle, means movable into engagement with the door to lock it in the open position to permit the rats to pass through the trap freely, latch mechanism for holding the door open when it is unlocked and the trap is set, a manually controlled door for the other end of the receptacle, and means within the receptacle operable by the rat therein to trip the latch mechanism and close the sliding door.

5. A rat trap comprising, in combination, a hollow receptacle provided with open ends and having an unobstructed passage through the receptacle for the free passage of rats into, through and out of the trap, a door for automatically closing one end of the receptacle, a lock for retaining the door open to allow a rat to pass unmolested through and out of the trap, a latch operable to hold the door in its open position when released from the lock and the trap is set, means within the hollow receptacle operable by the rat to trip the latch and permit the door to close, and means adapted to close the other end of the receptacle.

6. A rat trap comprising, in combination, a hollow receptacle provided with open ends and having an unobstructed passage through the receptacle for the free passage of rats into, through and out of the trap, a door for automatically closing one end of the receptacle, a lock for retaining the door open to allow a rat to pass unmolested through and out of the trap, a sliding latch operable to hold the door in its open position when released from the lock and the trap is set, a treadle pivotally mounted within the receptacle adjacent the floor thereof, oppositely disposed links connected to side portions of the treadle and extending upwardly therefrom, connections including a rocking lever between the links and sliding latch for tripping the latter when the treadle is depressed to thereby close the door, and a door for closing the other end of the receptacle.

In testimony whereof I have signed my name to this specification.

FRANK G. DRESSER.